Figure 1:
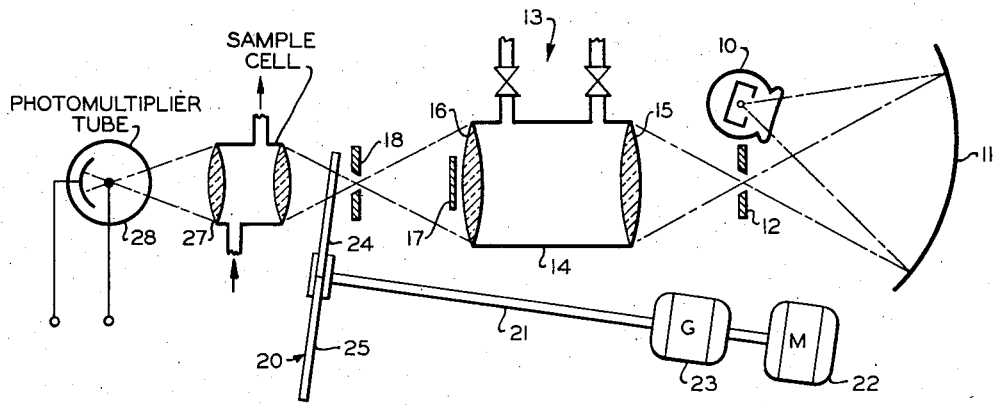

Aug. 18, 1959     M. S. SPARKS, JR     2,900,510

ANALYZER

Filed Oct. 31, 1955

INVENTOR.
M. S. SPARKS, JR.

BY *Hudson + Young*

ATTORNEYS

United States Patent Office 2,900,510
Patented Aug. 18, 1959

2,900,510

ANALYZER

Marshall S. Sparks, Jr., Los Angeles, Calif., assignor to Phillips Petroleum Company, a corporation of Delaware Application October 31, 1955, Serial No. 543,733

8 Claims. (Cl. 250—43.5)

This invention relates to an improved optical analyzer. In another aspect it relates to apparatus for measuring radiation which fluctuates in magnitude in a predetermined manner.

Various types of optical analyzers have recently been developed to detect substances in terms of the radiation absorption properties thereof. One particular instrument employed for this purpose comprises means to direct a beam of radiation through a sample cell containing a substance to be analyzed. A mechanical chopper is rotated in the beam at a predetermined frequency. This chopper comprises alternate sections of material which are transparent to the radiation and which have radiation absorption properties similar to those of the substance under analysis. The resulting radiation beam thus fluctuates in intensity in substantially a rectangular wave form. The difference in amplitude between adjacent half cycles of the wave form is representative of the amount of substance under analysis present in the sample cell. This difference is measured by suitable detecting means to provide a corresponding electrical signal.

The over-all intensity of the radiation beam often varies slightly because of fluctuations in the power supply to the source of radiation, ambient temperature changes, and other factors. In order to obtain an output electrical signal which is representative solely of the amount of the substance under analysis, it is important that the D.C. level of the output signal be maintained constant. In accordance with the present invention, a detecting circuit is provided which transmits and measures A.C. fluctuations in the electrical signal, but which maintains the D.C. level of the signal constant despite fluctuations in intensity of the radiation source. The detecting circuit comprises a photomultiplier tube having a vacuum tube amplifier in the output circuit thereof. A voltage dividing network is connected in the cathode circuit of the vacuum tube so that fluctuations in intensity of the light source result in a corresponding potential difference across the network. The dynodes of the photomultiplier tube are connected to spaced points on the voltage dividing network. A capacitor is connected in parallel with the voltage dividing network to eliminate the regulating effect of alternating components of the signal being measured. The A.C. signal is thus transmitted.

Accordingly, it is an object of this invention to provide improved apparatus to analyze fluid streams in terms of the radiation absorption properties thereof.

Another object is to provide apparatus for measuring radiation beams which fluctuate in intensity in a predetermined manner.

A further object is to provide apparatus to regulate the output of photomultiplier tubes.

Figure 2:
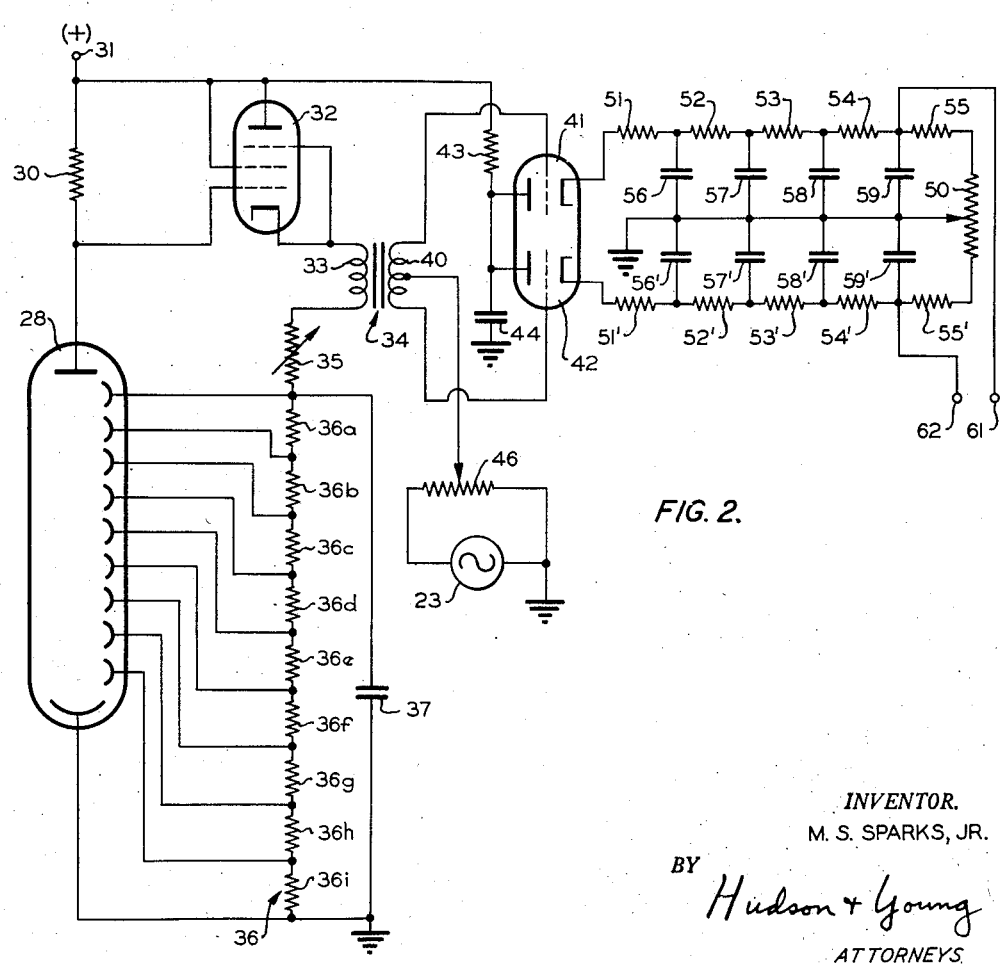

Other objects, advantages and features of the invention should become apparent from the following detailed description taken in conjunction with the accompanying drawing in which:

Figure 1 is a schematic view of the optical system of an analyzer in which the present invention is particularly applicable; and Figure 2 is a schematic circuit diagram of the measuring circuit of the present invention.

Referring now to the drawing in detail and to Figure 1 in particular, there is shown an optical analyzer which is particularly adapted to detect butadiene in a fluid stream. Radiation in the ultraviolet spectrum is provided by a source 10 which can be a hydrogen discharge lamp. Radiation emitted from source 10 is directed by a mirror 11 through an aperture 12 to a focal isolation monochromator 13. Monochromator 13 comprises a cell 14 having lenses 15 and 16 at the two ends. A circular mask 17 is positioned adjacent lens 16, and an exit aperture 18 is spaced therefrom. Mask 17 blocks the axial rays of radiation which are transmitted through lenses 15 and 16. Because of the chromatic aberration of the lenses, radiation of different wave lengths have different focal points with respect to aperture 18. Thus, mask 17 and aperture 18 block wave lengths longer and shorter than a predetermined value so that only a selected band of wave lengths is transmitted through the assembly. In the analysis of butadiene, it is desired to adjust the assembly so that wave lengths in the region of approximately 2000 to 2800 Angstroms are transmitted. The interior of cell 14 can be filled with a filter material, such as chlorine gas, which has an ultraviolet cutoff at approximately 2750 Angstroms. This makes the adjustment of the monochromator less critical.

A chopper disc 20 is positioned to rotate in the beam of radiation transmitted through aperture 18. Disc 20 is connected by a shaft 21 to a synchronous motor 22. An alternating current generator 23 is also connected to drive shaft 21. The function of generator 23 is discussed hereinafter in detail. Disc 20 comprises two sectors 24 and 25 which are constructed of quartz and Vycor, respectively. Vycor is a glass manufactured by Corning Glass Works, Corning, New York, and contains approximately 96 percent silicon dioxide. The ultraviolet transmission properties of Vycor are simlar to those of butadiene. Quartz is transparent to radiation of wave lengths in the region of interest whereas butadiene and Vycor are partially opaque. Rotation of disc 20 in the radiation beam thus results in a transmitted beam of radiation having an amplitude which varies in substantially the manner of a rectangular wave form.

This fluctuating radiation beam is directed through a sample cell 27 that is adapted to receive the material to be analyzed. The beam emerging from sample cell 27 is directed to a photomultiplier tube 28. The half cycles of the transmitted beam which pass through the Vycor sector of disc 20 do not change in intensity when transmitted through cell 27. However, the half cycles of radiation which pass through the quartz sector are diminished in intensity in accordance with the amount of butadiene present in the sample cell. The difference in intensity between the two half cycles thus provides an indication of the amount of butadiene present in the sample cell. This difference is measured by the detecting circuit connected to photomultiplier tube 28.

The detecting circuit of the present invention is illustrated in Figure 2. The cathode of photomultiplier tube 28 is connected to ground. The anode of tube 28 is connected through a resistor 30 to a terminal 31 which is maintained at a steady positive potential. The anode of tube 28 is also connected to the control grid of a pentode 32. The anode and screen grid of pentode 32 are connected to terminal 31. The cathode and suppressor grid of pentode 32 are connected to the first terminal of the primary winding 33 of a transformer 34. The second terminal of transformer winding 33 is connected to the first terminal of a variable resistor 35. The second terminal of resistor 35 is connected to ground through a voltage dividing network 36 which comprises series connected resistors 36a, 36b . . . 36i. A capacitor 37 is connected in parallel with network 36. The dynodes of tube 28 are connected to respective junctions between the resistors of network 36, as illustrated.

The end terminals of the secondary winding 40 of transformer 34 are connected to the control grids of triodes 41 and 42, respectively. The anodes of triodes 41 and 42 are connected to terminal 31 through a resistor 43. A capacitor 44 is connected between these two anodes and ground. The center tap of transformer winding 40 is connected to the contactor of a potentiometer 46. Generator 23 is connected across the end terminals of potentiometer 46, one terminal of generator 23 being connected to ground. The cathode of triode 41 is connected to the first end terminal of a potentiometer 50 through series connected resistors 51, 52, 53, 54 and 55. A capacitor 56 is connected between ground and the junction between resistors 51 and 52; a capacitor 57 is connected between ground and the junction between resistors 52 and 53; a capacitor 58 is connected between ground and the junction between resistors 53 and 54; and a capacitor 59 is connected between ground and the junction between resistors 54 and 55. The contactor of potentiometer 50 is connected to ground. The cathode of triode 42 is connected to the second end terminal of potentiometer 50 through series connected resistors 51', 52', 53', 54' and 55'. Capacitors 56', 57', 58' and 59' are connected in a manner corresponding to respective capacitors 56, 57, 58 and 59. A first output terminal 61 is connected to the junction between resistors 54 and 55. A second output terminal 62 is connected to the junction between resistors 54' and 55'.

Any change in the amount of radiation received by tube 28 results in a corresponding signal being applied through cathode follower 32 to the primary winding of transformer 34. The signal induced in the secondary winding 40 is applied to the respective control grids of triodes 41, and 42, 180° out of phase. A sinusoidal reference signal supplied by generator 23 is superimposed upon the signals applied to the two control grids. The signal from generator 23 is in phase with the rectangular wave form being measured from tube 28 because generator 23 is synchronized with chopper disc 20. Triodes 41 and 42 and the associated filter circuit thus provide a synchronous rectifier so that the output signal between terminals 61 and 62 is of polarity and amplitude representative of the differences in amplitudes between the two half cycles of the rectangular wave form signal from tube 28. It is preferred that the reference voltage supplied by generator 23 have an amplitude of approximately twice as great as the amplitude of the signal from pentode 32.

In accordance with the present invention a voltage regulating network is provided to maintain the D.C. component of the signal from tube 28 constant despite minor fluctuations in the intensity of the radiation beam. If the conduction through tube 28 should increase due to an increase in intensity of the beam, the voltage at the anode of tube 28 decreases so as to decrease the voltage at the cathode of pentode 32. This decrease in voltage decreases the potential drop across network 36 so that each dynode in tube 28 is maintained at a lower voltage. These lower voltages reduce the gain of tube 28 so that the conduction therethrough diminishes to the original value. Conversely, if the radiation beam should decrease in intensity there is less conduction through tube 28. This results in an increase in potential at the anode thereof and in the potential drop across network 36. The increase in potential drop increases the voltages on the dynodes of tube 28 to increase the gain of the tube.

This voltage regulating action is not responsive to the alternating component of the measured signal. Capacitor 37 is sufficiently large to pass alternating currents of the frequency corresponding to the frequency of the A.C. signal being measured. These A.C. fluctuations are grounded through capacitor 37. Thus, the regulating circuit compensates for fluctuations in the D.C. level of the measured signal but is not influenced by the A.C. component of the signal. The A.C. component induces a signal in the secondary winding of transformer 34, and it is this signal that is measured and applied to the output terminals 61 and 62.

In one specific embodiment of this invention the following circuit components were employed: resistor 30, 10 megohms; resistor 35, 10,000 ohms; resistors 36a, 36b . . . 36h, 12,000 ohms each; resistor 36i, 24,000 ohms; resistor 43, 100,000 ohms; resistors 51, 52, 53, 54, 51', 52', 53' and 54', 6,800 ohms each; resistors 55 and 55', 270 ohms each; potentiometer 46, 49,000 ohms; potentiometer 50, 250 ohms; capacitor 37, 1.0 microfarad; capacitors 56, 57, 58, 56', 57' and 58', 100 microfarads each; capacitors 59 and 59', 30 microfarads each; capacitor 44, 10 microfarads; pentode 32, type 5654; triodes 41 and 42, type 12AX7; and tube 28, type IP28. Terminal 31 was maintained at 500 volts, and the frequency of the signal from generator 23 was thirty cycles per second.

From the foregoing description it should be evident that there is provided in accordance with this invention an improved electrical circuit which is adapted to measure the fluctuations in a radiation beam. This circuit also provides a regulating action so that changes in the D.C. level in the measured signal do not change the output signal. This regulation is provided by a minimum number of circuit components.

While the invention has been described in conjunction with a present preferred embodiment it should be evident that it is not limited thereto.

What is claimed is:

1. Apparatus for measuring fluctuations in radiation beams comprising a photomultiplier tube having an anode, a cathode and a plurality of dynodes; a voltage dividing network comprising a plurality of resistors connected in series relationship; a capacitor connected in parallel with said network; means connecting said dynodes to junctions between selected ones of said resistors; means applying potential differences between the anode and cathode of said tube and across said network so that conduction through said tube is a function of radiation impinging thereon; means responsive to conduction through said tube to vary the potential across said network so that the potential across said network is an inverse function of conduction through said tube; and means to measure fluctuations in current through said tube.

2. Apparatus for measuring fluctuations in radiation beams comprising a photomultiplier tube having an anode, a cathode and a plurality of dynodes; a first resistance element having one terminal thereof connected to the anode of said photomultiplier tube; means applying a voltage between the second terminal of said first resistance element and the cathode of said photomultiplier tube; a vacuum tube having at least an anode, a cathode and a control grid; a resistance voltage dividing network having one terminal thereof connected to the cathode of said vacuum tube; means applying a voltage between the anode of said vacuum tube and the second terminal of said network; means connecting the anode of said photomultiplier tube to the control grid of said vacuum tube; means connecting said dynodes to spaced points on said voltage dividing network; a capacitor connected in parallel with said voltage dividing network; and means to measure fluctuations in current through said vacuum tube.

3. The combination in accordance with claim 2 wherein the voltages applied across said tubes are obtained from a common source.

4. The combination in accordance with claim 2 wherein said means to measure fluctuations in current comprises a transformer having the primary winding thereof connected in the anode-cathode circuit of said vacuum tube, and means to measure the signal induced in the secondary winding of said transformer.

5. An analyzer comprising a radiation source; a radiation detector positioned to receive radiation from said source, said radiation detector comprising a photomultiplier tube having an anode, a cathode and a plurality of dynodes, a voltage dividing network comprising a plurality of resistors connected in series relationship, a capacitor connected in parallel with said network, means connecting said dynodes to junctions between selected ones of said resistors, means applying potential differences between the anode and cathode of said tube and across said network so that conduction through said tube is a function of radiation impinging thereon, and means responsive to conduction through said tube to vary the potential across said network so that the potential across said network is an inverse function of conduction through said tube; means to interpose a sample of material to be analyzed into said radiation beam; a chopper positioned in the path of said beam, said chopper having a section transparent to radiation of a wave length absorbed by a material to be detected and a section opaque to radiation at said wave length; a rotatable shaft attached to said chopper; a motor connected to said shaft to rotate same; a generator driven by said shaft to provide a voltage of alternating character synchronized with rotation of said shaft; a synchronous rectifier; means to apply the output signal of said generator to said rectifier; and means to apply a voltage to said rectifier representative of fluctuations in current through said photomultiplier tube, the output of said rectifier being representative of the material to be detected.

6. An analyzer comprising a radiation source; a radiation detector positioned to receive radiation from said source, said detector comprising a photomultiplier tube having an anode, a cathode and a plurality of dynodes, a first resistance element having one terminal thereof connected to the anode of said photomultiplier tube, means applying a voltage between the second terminal of said first resistance element and the cathode of said photomultiplier tube, a vacuum tube having at least an anode, a cathode and a control grid, a direct current voltage dividing network having one terminal thereof connected to the cathode of said vacuum tube, means applying a voltage between the anode of said vacuum tube and the second terminal of said network, means connecting the anode of said photomultiplier tube to the control grid of said vacuum tube, means connecting said dynodes to points on said voltage dividing network, and a capacitor connected in parallel with said voltage dividing network; means to interpose a sample of material to be analyzed into said radiation beam; a chopper positioned in the path of said beam, said chopper having a section transparent to radiation of a wave length absorbed by a material to be detected and a section opaque to radiation at said wave length; a rotatable shaft attached to said chopper; a motor connected to said shaft to rotate same; a generator driven by said shaft to provide a voltage of alternating character synchronized with rotation of said shaft; a synchronous rectifier; means to apply the output signal of said generator to said rectifier; and means to apply a voltage to said rectifier representative of fluctuations in current through said photomultiplier tube, the output of said rectifier being representative of the material to be detected.

7. An analyzer comprising a radiation source; a radiation detector positioned to receive radiation from said source, said radiation detector comprising a photomultiplier tube having an anode, a cathode and a plurality of dynodes, a voltage dividing network comprising a plurality of resistors connected in series relationship, a capacitor connected in parallel with said network, means connecting said dynodes to junctions between selected ones of said resistors, means applying potential differences between the anode and cathode of said tube and across said network so that conduction through said tube is a function of radiation impinging thereon, and means responsive to conduction through said tube to vary the potential across said network so that the potential across said network is an inverse function of conduction through said tube; means to interpose a sample of material to be analyzed into said radiation beam; a chopper positioned in the path of said beam, said chopper having a section transparent to radiation of a wave length absorbed by a material to be detected and a section opaque to radiation at said wave length; a motor to rotate said chopper; and means to measure fluctuations in current through said photomultiplier tube.

8. An analyzer comprising a radiation source; a radiation detector positioned to receive radiation from said source, said detector comprising a photomultiplier tube having an anode, a cathode and a plurality of dynodes, a first resistance element having one terminal thereof connected to the anode of said photomultiplier tube, means applying a voltage between the second terminal of said first resistance element and the cathode of said photomultiplier tube, a vacuum tube having at least an anode, a cathode and a control grid, a direct current voltage dividing network having one terminal thereof connected to the cathode of said vacuum tube, means applying a voltage between the anode of said vacuum tube and the second terminal of said network, means connecting the anode of said photomultiplier tube to the control grid of said vacuum tube, means connecting said dynodes to points on said voltage dividing network, and a capacitor connected in parallel with said voltage dividing network; means to interpose a sample of material to be analyzed into said radiation beam; a chopper positioned in the path of said beam, said chopper having a section transparent to radiation of a wave length absorbed by material to be detected and a section opaque to radiation at said wave length; a motor to rotate said chopper; and means to measure fluctuations in current through said photomultiplier tube.

References Cited in the file of this patent
UNITED STATES PATENTS

| | | |
|---|---|---|
| 2,407,564 | Martin et al. | Sept. 10, 1946 |
| 2,534,657 | Bray | Dec. 19, 1950 |
| 2,594,703 | Wouters | Apr. 29, 1952 |
| 2,614,226 | Davis | Oct. 14, 1952 |
| 2,764,692 | Miller | Sept. 25, 1956 |